Patented Mar. 17, 1936

2,033,947

UNITED STATES PATENT OFFICE 2,033,947

TREATMENT OF LOW GRADE RESIN

William Burns Logan, Lake Charles, La., and Ismond E. Knapp, Pensacola, Fla., assignors to Newport Industries, Inc., Pensacola, Fla., a corporation of Delaware No Drawing. Application August 4, 1933, Serial No. 683,626

17 Claims. (Cl. 87—16)

This invention relates to the separation of acid from non-acid constituents in low grade wood resins and to the novel products obtained thereby.

More specifically this invention relates to the separation of the acid constituents from the non-acid constituents of dark colored resins, such as are produced as by-products in the purification of wood resin. The invention also includes the production of novel products which are valuable sizing agents and are suitable for other technical uses for which the dark resins themselves are unsuited.

Ordinary wood resin recovered by the usual methods of steam and/or solvent extraction of dead resinous wood is relatively dark in color, being usually classed as grade "FF". Since the dark coloration of FF wood resin greatly limits its use in commerce, purification processes are largely used to separate the colored constituents from the resin to produce paler grades of wood resin which may be used interchangeably with the pale grades of gum resin.

The amount of dark colored constituents that must be removed from "FF" wood resin in order to produce the pale grades of resins suitable for commercial use is comparatively high, amounting to as much as 25% or more, depending upon the purification process employed. The separated material containing the dark colored constituents has a low acid number, a low saponification number and a large amount of matter that is insoluble in solvents such as gasoline and petroleum ether. It is so different from resins in general which are comparatively high in abietic acid content and substantially completely soluble in solvents such as gasoline and petroleum ether that it cannot be commercially labeled as a resin. It is referred to in the trade and in this specification as grade "B" wood resin, or "low grade wood resin".

"B" wood resin is composed of a number of constituents such as resin acids of unknown composition, oxygenated and hydroxylated resin acids, relatively much larger amounts of esters and resenes and relatively much smaller amounts of abietic acid than ordinary resins. The esters and resenes, which are properly classified as non-acid materials, amount to from 25 to 35% of the "B" wood resin while 15% of non-acid materials is a high amount for ordinary resins.

"B" wood resin is comparatively useless for some of the common commercial applications of resin. For example, if the "B" wood resin is made into a sodium soap to be used as a paper size, the sizing efficiency is very poor and the size tends to gum up the felts, wires, etc. of paper making machinery. It has been thought that the poor sizing efficiency was due to the low abietic acid content of the resin. We have now discovered that the poor sizing efficiency is due to the abnormally high content of non-acid constituents in the "B" wood resin since, by reducing the non-acid content, we have been able to produce soaps from "B" wood resin which give as high or even superior sizing efficiency than the abietic acid soaps of ordinary resins.

When "B" wood resin is combined with a basic alkali metal compound such as an alkali metal hydroxide or carbonate to produce a water soluble soap, the non-acid constituents do not combine with the alkali and are insoluble in water but because of the emulsifying property of the soap formed these water insoluble substances appear to be water soluble.

We have found that the acid constituents of "B" wood resin, which are the resin acids of unknown compositions, the oxygenated and hydroxylated resin acids and the small amount of abietic acid present cannot be effectively freed of the non-acid constituents by the ordinary means one would employ for such separation such as by fractional distillation or by selective solubility. We have discovered, however, that under proper conditions certain water-immiscible, hydrocarbon solvents are capable of selectively dissolving the non-acid constituents of "B" wood resin when the soaps of the acid constituents are in water solution of definite concentrations. We have, therefore, taken advantage of this discovery to provide a process for the separation of the soap forming, or acid constitutents, from the non-soap forming, or non-acid constituents, of low grade wood resin such as "B" wood resin.

It is, therefore, an object of this invention to provide a process for the separation of the acid from the non-acid constituents in low grade wood resin containing only small amounts of abietic acid.

Another object of this invention is to provide a process for treating low grade wood resin to obtain therefrom technically useful products in high yield.

Another object of this invention is to prepare a high quality sizing material from low grade wood resin such as is produced as a by-product in the purification of grade "FF" wood rosin.

Another object of this invention is to separate into technically useful products the low grade resin product obtained as a by-product in the purification of wood resin to produce a pale rosin.

A specific object of this invention is to separate the acid from the non-acid constituents present in the dark colored by-product obtained in the purification of wood rosin and thereby obtain commercially useful products.

Other and further objects of this invention will be apparent from the specification and claims.

The dark colored acid and non-acid resinous bodies removed from wood rosins during the purification processes when admixed with each other cannot be separated effectively by extracting with any one or a combination of hydrocarbon water-immiscible solvents by themselves. However, when the acidic constituents are neutralized and the soaps so formed are dissolved in water, such soaps are relatively insoluble in hydrocarbon water-immiscible solvents, while the non-acidic constituents are soluble in the same solvents.

In the process of our invention we prefer to employ a soap concentration in water exceeding 50% and more preferably about 70%. Water solutions of neutral soaps of ordinary rosins which contain 80% or more of abietic acid jell even while hot in concentrations greater than 45 to 50%. However, this is not the case with resins of low abietic acid content such as, for example, "B" wood resin. Our process is therefore particularly adaptable to resins of low abietic acid content whose soaps do not form jells at the concentrations commonly employed in making paper size.

We have used a large variety of water-immiscible hydrocarbon solvents in our process. Among the solvents which we have successfully used are included all the relatively low boiling petroleum solvents, hydrogenated petroleum solvents, toluene, benzene, xylene, coal tar naphtha and terpene hydrocarbons, as well as mixtures of these types of solvents. Since the process is essentially one of selectively extracting materials from a relatively concentrated aqueous soap solution the operation is preferably conducted at temperatures above room temperature in order to reduce the viscosity of the soap solution and to facilitate separation of the soap and solvent layers, although it is to be understood that we do not limit our process to hot extraction. The solvent power of the solvent or mixture of solvents (its ability to selectively dissolve the non-acid "B" wood resin constituents from the aqueous soap) and the solubility of the solvent or mixture of solvents employed in the aqueous soap layer are deciding factors in determining the temperature at which the extraction is conducted.

The operation may consist of one or a successive number of extractions with fresh solvent until the desired quantity of non-acid material has been removed from the aqueous soap layer or, if economy of solvent consumption is required, a cycle operation may be conducted.

The relatively low boiling petroleum solvents are not sufficiently strong solvents to remove more than about one-third of the non-acid constituents of the "B" wood resin from the water solution of the soap in the preferred concentrations if the extraction is conducted at the boiling point of the water-soap-solvent mixture at atmospheric pressure. This is not a great enough removal of non-acid material to give the best improvement in the product. We have discovered, however, that this type of solvent may be used satisfactorily if the extraction is conducted at a temperature higher than the boiling point of the water-soap-solvent mixture at atmospheric pressure. This is readily accomplished by extraction at the boiling point of the mix under a pressure greater than atmospheric pressure. For example, at atmospheric pressure, three successive extractions with petroleum naphtha using 1½ volumes of solvent to 1 volume of a water-soap solution containing about 67% of solids, will extract about 35% of the non-acid "B" resin constituents, while the same treatment at 20-pound gage pressure will extract about 60%. At 50-pounds gage pressure about 70% of the non-acid constituents are extracted.

A detailed example of a preferred commercial operation using petroleum naphtha as solvent is as follows. It will be understood that a large variation in the ratio of solvent to aqueous soap may be used.

Example 1

1000 pounds of "B" wood resin are treated at about 100° C. with 125 pounds of soda ash and 420 pounds of water until the alkali is combined. The crude soap thus obtained amounts to about 1535 pounds and contains about 66 to 68% solids. This soap is intimately contacted with about 270 gallons of petroleum naphtha at a temperature of 125 to 130° C. These conditions are conveniently attained at a pressure of 50 pounds gage in a closed vessel equipped with means for mechanical agitation. After agitation the mixture is allowed to separate into layers while still hot and the solvent layer or extract decanted from the water-soap layer. The pressure may be released in any convenient manner before decanting the extract layer or the extract may be drawn off while the mixture is still under pressure. The soap layer is then given a second and third treatment with 270 gallons of fresh solvent. After extraction is completed the water-soap layer contains a small amount of dissolved solvent, which must be removed.

The soap layer is then heated by any convenient means, for example, by a steam heated coil placed in the soap mass, until solvent begins to distill. Then a jet of live steam or other heated inert gas may be introduced into this soap solution until all of the solvent is removed. The aqueous soap solution during this treatment is maintained at a temperature high enough to prevent condensation of steam therein.

The steam and solvent vapors are condensed and separated and about 14 gallons of solvent is thus recovered for re-use. The soap after being freed of solvent may be adjusted to any desired solid content by the addition or elimination of water. A "dry size" of about 95% solid content may be produced with a drum or spray drier without injuring the product for paper mill use.

The normal yield of soap containing 60% solids is about 1380 pounds or approximately 150 gallons.

The solvent or extract layers are combined and the solvent is distilled off and recovered for re-use. The still residue from this operation is the non-acid resin material and amounts to from 200 to 225 pounds.

In order to illustrate the large variation in operation permitted by our process, the following is a detailed example of a commercial operation showing the use of a toluene-petroleum naphtha mixture as a solvent. Five volumes of toluene to one volume of petroleum naphtha are used to form the mixture. In this example a cycle operation is also illustrated.

Example 2

1000 pounds of "B" wood resin are treated at about 100° C with 125 pounds of soda ash and 420 pounds of water until the alkali is combined. The crude soap thus obtained amounts to about 1535 pounds and contains about 66 to 68% of solids. This soap is intimately contacted with about 325 gallons of the toluene-naphtha solvent from a previous extraction treatment and maintained at a temperature of 80 to 90° C. The two layers are allowed to separate while still hot and a solvent or extract layer of about 200 gallons is removed from the aqueous soap layer. The solvent from the extract layer is then distilled off, leaving a residue of from 220 to 250 pounds of non-acid resin material and yielding about 180 gallons of solvent for re-use.

The aqueous soap layer is extracted with about 270 gallons of fresh solvent as before and the separation into two layers again effected. The solvent layer of about 325 gallons is used for the first treatment of unextracted soap.

The soap layer is next subjected to the action of indirect heat until the solvent begins to distill and then a jet of live steam or heated inert gas is introduced in order to free any occluded solvent therefrom. The temperature of the soap layer is maintained high enough to avoid condensation of the live steam. The steam and solvent vapors are condensed and separated by gravity yielding about 90 gallons of solvent for re-use.

It is understood that the process outlined in the above examples may be varied within wide limits. For instance, the aqueous soap solution may be more or less concentrated if the necessary adjustment in volume of solvent used is made to give effective separation into the two layers. Also, basic alkali metal compounds other than soda ash may be used, such as, for example, potassium carbonate or sodium and potassium hydroxide.

The soap recovered by this process is similar to the resin soap now known commercially as "resin size" and may be used for sizing relatively dark colored paper, such as "Kraft", "Butchers" paper, etc. However, our product is of a distinctly different composition, since it contains only small amounts of abietic acid soap, whereas the soap of that acid is the main constituent of ordinary resin size. "B" wood resin itself is unsuited for use as a paper size, but by means of our process the non-acid constituents are separated from the resin to produce a resin size equal in sizing efficiency or superior to that made from much higher grade resin.

It is possible that a small amount of soap may be extracted with the non-acid resin material. This soap can, however, be readily removed if desired by simply washing the non-acid extract before evaporation of the solvent with weak acids, water or salt water. The use of weak acids, in some instances, may necessitate a subsequent water washing to separate out any occluded acids.

The non-acid material recovered by our process is a dark colored soft, sticky resin. It varies somewhat in composition depending on the solvent used. Typical analyses show acid numbers of from 5 to 20 and saponification numbers of 25 to 65, and the material is from 40 to 60% insoluble in cold petroleum naphtha. The product is entirely novel in composition and its relative neutrality and sticky nature make it a valuable base material for use as an adhesive or binder.

If desired, the soft non-acid constituents recovered may be hardened by condensation with hardening agents to yield high melting neutral resins. For example, if the non-acid constituents are heated with about 2% by weight of hexamethylenetetramine at 210° C. a resin having a melting point of 60 to 65° C. is obtained. A condensation with 4% of the hexamethylenetetramine raises the melting point to 80 to 100° C. It is obvious that other hardening agents such as formaldehyde and the like may be used in place of hexamethylenetetramine.

We are aware that numerous details of the process may be varied through a wide range without departing from the principles of this invention, and we, therefore, do not purpose limiting the patent granted hereon otherwise than necessitated by the prior art.

We claim as our invention:

1. The process of separating acid from non-acid constituents in grade "B" wood resins of low abietic acid content, which comprises combining the acid constituents of such resins with basic alkali metal compounds in aqueous solution and extracting the non-acid constituents from the aqueous soap with water-immiscible hydrocarbon solvents.

2. The process of separating "B" wood resin into technically useful constituents, which comprises combining the resin with an aqueous solution of a basic alkali metal compound to form a resin soap, extracting the non-soap forming constituents from the aqueous solution of the soap with a water-immiscible hydrocarbon solvent, removing the solvent from the non-soap forming constituents and removing any remaining solvent from the aqueous soap solution.

3. The process of separating dark colored resinous products of low abietic acid content obtained in the purification of wood resin into technically useful constituents, which comprises treating said products with an aqueous solution of a basic alkali metal compound to combine the acid constituents thereof, intimately contacting the resulting mass with a water-immiscible hydrocarbon solvent, allowing the solvent layer to separate from the aqueous layer, removing the solvent layer and separating solvent from said aqueous layer.

4. The process of separating dark colored resinous products of low abietic acid content obtained in the purification of wood rosin into technically useful constituents, which comprises treating said products with an aqueous solution of a basic alkali metal compound to combine the acid constituents thereof, intimately contacting the resulting mass with a water-immiscible hydrocarbon solvent selected from the group consisting of petroleum solvents, hydrogenated petroleum solvents, toluene, benzene, xylene, coal tar naphtha, terpene hydrocarbons, or mixtures of said solvents, allowing the solvent layer to separate from the aqueous layer, removing the solvent layer and separating solvent from said aqueous layer.

5. The process of separating "B" wood resin into technically useful constituents, which comprises treating said resin with an aqueous solution of a basic alkali metal compound until the acid constituents in the resin have been converted into a resin soap, subjecting the mass to intimate contact with a water-immiscible solvent selected from the group consisting of petroleum solvents, hydrogenated petroleum solvents, toluene, benzene, xylene, coal tar naphtha, terpene hydrocarbons or mixtures of said solvents, allowing the mass to separate into layers, withdrawing the solvent layer, recovering the non-acid constituents from the solvent layer and recovering the aqueous resin soap freed from the solvent.

6. The process of producing technically useful products from low grade wood resin which comprises treating grade "B" wood resin low in abietic acid content with an aqueous solution of a basic alkali metal compound until the acid constituents of the resin are combined, adding a water-immiscible hydrocarbon solvent to the mass, allowing the mixture to separate into layers, separating the layers, adding more solvent to the aqueous layer and again separating the resulting layers, blowing an inert gas through the aqueous layer to remove any occluded solvent, and evaporating the solvent from the solvent layers to recover a non-acid resin material.

7. The process of separating "B" wood resin into technically useful products which comprises treating said resin with an aqueous solution of a basic alkali metal compound to form a resin soap, extracting the resulting solution with a water-immiscible hydrocarbon solvent, separating the solvent and aqueous layers, evaporating the solvent from the solvent layer to recover a non-acid resin of commercial importance and dehydrating the aqueous layer to recover a substantially anhydrous soap.

8. In the process of separating "B" wood resin into technically useful products the step which comprises extracting an aqueous solution of "B" wood resin soap with a water-immiscible hydrocarbon solvent to remove the non-acid materials therefrom.

9. In the process of separating the acid and non-acid constituents of a wood resin low in abietic acid content the steps which comprise reacting the resin with an aqueous solution of an alkali metal base to combine the acid constituents and extracting the non-acid constituents from the solution with a water-immiscible hydrocarbon solvent.

10. The process of separating the acid from the non-acid constituents in resins of low abietic acid content, which comprises reacting resins of low abietic acid content with aqueous solutions of basic alkali metal compounds until the acid constituents of such resins are combined with the alkali metal to form soaps, and extracting at temperatures above the boiling point of the solution at atmospheric pressure the non-acid constituents from the aqueous soaps under pressure in a closed container with a heated water-immiscible hydrocarbon solvent.

11. The process of separating grade "B" resins of low abietic acid content into technically useful products, which comprises reacting the acid constituents of such resins with aqueous solutions of basic alkali metal compounds to form rosin soaps, extracting the resulting aqueous soap solution at temperatures above the boiling point of the solution at atmospheric pressure with hot, water-immiscible hydrocarbon solvents under pressure in a closed vessel, separating the solvent and aqueous layers, again extracting the soap solution with fresh heated hydrocarbon solvents and removing the solvents from the extracted soap solution to yield a solution adapted to be used as a paper size.

12. The process of separating grade "B" resins of low abietic acid content into technically useful acid and non-acid constituents which comprises heating about 1,000 pounds of "B" wood resin with about 125 pounds of soda ash at about 100° C. in the presence of about 420 pounds of water until substantially all of the acid constituents are combined to form a resin soap, intimately contacting the soap solution with petroleum naphtha at temperatures about 125 to 130° in a closed vessel maintained under pressure, agitating the mixture of soap solution and naphtha, allowing the mixture to separate into layers while still hot, removing the solvent layer, again extracting the soap solution with fresh petroleum naphtha, removing the solvent from the soap solution to form a resin soap adapted to be used as a paper size, and recovering technically useful non-acid constituents from the solvent layer.

13. The process of separating "B" wood resin into technically useful products which comprises reacting about 1,000 pounds of said wood resin at temperatures of about 100° with 125 pounds of soda ash in the presence of about 420 pounds of water until the alkali has combined with substantially all the acid constituents to form a resin soap, intimately contacting the soap at temperatures between 80 and 90° C. with about 325 gallons of a solvent consisting of 5 volumes of toluene to 1 volume of petroleum naphtha, allowing the resulting mixture to separate into layers while still hot, removing the solvent from the solvent layer to yield non-acid products of value, again extracting the aqueous soap layer with fresh solvent and removing any solvent remaining in the aqueous layer to yield a paper size.

14. The process of preparing a resin soap from "B" wood resin, which comprises treating said resin with an aqueous solution of a basic alkali metal compound to form a resin soap, extracting the non-saponified resins in the resulting solution with a water-immiscible hydrocarbon solvent, separating the solvent and aqueous layers and dehydrating the aqueous layer to recover a resin soap.

15. The process of preparing a resin soap from wood resins of low abietic acid content, which comprises reacting the acid constituents of such resins with an aqueous solution of a basic alkali metal compound to form a resin soap, extracting the resulting aqueous soap solution with a hot, water-immiscible hydrocarbon solvent under pressure, separating the solvent and aqueous layers, extracting the aqueous layer of the soap solution with a fresh heated hydrocarbon solvent and removing the hydrocarbon solvent from the extracted soap solution to yield a solution of a resin soap adapted to be used as a paper size.

16. The process of preparing a resin soap from resins of low abietic acid content, which comprises heating "B" wood resin with soda ash at about 100° C. in the presence of water until substantially all of the acid constituents are combined to form a resin soap, intimately contacting the soap solution with petroleum naphtha at temperatures about 125 to 130° C. under pressure, agitating the mixture of soap solution and naphtha, allowing the mixture to separate into layers while still hot, removing the solvent layer, again extracting the soap solution with fresh petroleum naphtha and removing the naphtha from the soap solution to form a resin soap adapted to be used as a paper size.

17. The process of preparing a resin soap from "B" wood resin, which comprises reacting "B" wood resin at temperatures of about 100° C. with soda ash in the presence of water until the alkali has combined with substantially all the acid constituents to form a resin soap, intimately contacting the soap at temperatures between 80 and 90° C. with a solvent mixture of toluene and petroleum naphtha, allowing the resulting mixture while still hot to separate into layers including an aqueous soap layer, extracting the aqueous soap layer with fresh solvent and removing any solvent remaining in the aqueous layer to yield a resin soap suitable for use as a paper size.

WILLIAM BURNS LOGAN.
ISMOND E. KNAPP.

CERTIFICATE OF CORRECTION.

Patent No. 2,033,947. March 17, 1936.

WILLIAM BURNS LOGAN, ET AL.

It is hereby certified that error appears in the printed specification of the above numbered patent requiring correction as follows: Page 1, first column, lines 8, 13, 17, 20 (both occurrences), and lines 22, 24 and 37 respectively, for "resin" read rosin; and same column, lines 25 and 33, for "resins" read rosins; and that the said Letters Patent should be read with these corrections therein that the same may conform to the record of the case in the Patent Office.

Signed and sealed this 28th day of April, A. D. 1936.

Leslie Frazer
Acting Commissioner of Patents.

(Seal)